US010115143B2

(12) United States Patent
Lory

(10) Patent No.: US 10,115,143 B2
(45) Date of Patent: Oct. 30, 2018

(54) TEAM PLAYER ATHLETIC JERSEY AND ORDERING INTERFACE

(71) Applicant: Shannon J. Lory, Waunakee, WI (US)

(72) Inventor: Shannon J. Lory, Waunakee, WI (US)

(*) Notice: Subject to any disclaimer, the term of this patent is extended or adjusted under 35 U.S.C. 154(b) by 702 days.

(21) Appl. No.: 14/611,729

(22) Filed: Feb. 2, 2015

(65) Prior Publication Data

US 2015/0221009 A1  Aug. 6, 2015

Related U.S. Application Data

(60) Provisional application No. 61/934,346, filed on Jan. 31, 2014.

(51) Int. Cl.
*G06Q 30/06* (2012.01)
*A41D 1/04* (2006.01)

(52) U.S. Cl.
CPC .......... *G06Q 30/0621* (2013.01); *A41D 1/04* (2013.01)

(58) Field of Classification Search
CPC .......................................... G06Q 30/06–30/08
USPC ............................................... 705/26.1–27.2
See application file for complete search history.

(56) References Cited

U.S. PATENT DOCUMENTS

2006/0048261 A1* 3/2006 Smith ................ A41D 13/0015 2/69

OTHER PUBLICATIONS

Custom Made Split NFL Game Jerseys, http://siamtradingpost.com/split-nfl-game-jerseys/comment-page-1/#comments, Oct. 11, 2013.*
Part 4—An Insider's Guide to the World of Licensed Sports Products: Quality Control—Where the Real Power in Licensed Sports Lies, http://licensedsports.blogspot.com/2012/03/insiders-guide-to-world-of-licensed_2268.html, Mar. 1, 2012.*
Part 8—An Insider's Guide to the World of Licensed Sports Products: Royalty Rates—Is 12% the norm and when 12% isn't enough, http://licensedsports.blogspot.com/2012/03/insiders-guide-to-world-of-licensed_2802.html, Mar. 1, 2012.*

* cited by examiner

*Primary Examiner* — Ming Shui

(57) ABSTRACT

Systems and methods for selection and creation of custom athletic jerseys are described. The athletic jerseys combine two different jerseys. For instance, the jersey may have a front half consisting of one jersey and back half consisting of another jersey. The jerseys may be related to a number of different sports teams, for instance, professional sports teams, college sports teams, and high school sports teams. This allows a fan to own a single jersey that represents multiple points in a player's career. Automatic validation of the license associated with each jersey may be provided and the purchase price of the athletic jersey may include relevant licensing fees. Additionally, a user interface may be provided that allows a user to select amongst a number of possible options.

4 Claims, 4 Drawing Sheets

TEAM PLAYER ATHLETIC JERSEY AND ORDERING INTERFACE

CROSS-REFERENCE TO RELATED APPLICATION

This application claims a benefit of priority based on patent application 61/934,346, filed Jan. 31, 2014, the entire contents of which are hereby expressly incorporated by reference into the present application.

BACKGROUND OF THE INVENTION

The field of sports apparel has demonstrated little innovation. Consumers' lone purchase decision is whether they want the home design or away design of a particular player's jersey. In some cases, fans can purchase jerseys customized with their name on them. In rare cases, teams have offered split jerseys, tailored with the left side featuring home design and right side featuring away design or vice versa. In all situations, the point of purchase where the customer orders their jersey is a take-it-or-leave-it scenario with next to no options. This is further complicated by complex licensing issues resulting from agreements between teams, leagues, and manufacturers. Today there is not an option for a consumer to purchase a jersey that supports a player throughout his or her career.

No matter the configuration and situation, today's jerseys only illustrate the current contracted team of the player in question. The moment that player signs a contract or is traded to a different team, a replica of the player's earlier jersey passes into "retro" status.

SUMMARY AND OBJECTS OF THE INVENTION

By way of summary, the present invention is directed to a team player athletic jersey and ordering interface that gives fans more options with regard to a team player sports jersey. In accordance with a first aspect of the invention, a team player athletic jersey is provided that allows a purchaser to incorporate aspects of a jersey from a player's earlier career as well as the player's current career. For instance, in one embodiment, a first jersey portion has a first design associated with an athlete and the second jersey portion has a second design associated with the athlete. The first jersey portion and the second jersey portion represent different jerseys from the athlete's career. In one embodiment, the first jersey portion is a front half of a jersey and the second jersey portion is a back half of a jersey. The first jersey portion and the second jersey portion could both be premade and later assembled. As such, the jersey may be custom made to order. The designs may be from a variety of different teams, such as professional team jerseys, college team jerseys, and high school team jerseys. The designs may also be home or away jersey designs. As these jersey portions may be licensed designs, the purchase price may include a license fee, and the license may be automatically verified when the jersey is purchased.

In accordance with a second aspect of the present invention, a method of ordering a team player athletic jersey is provided. The method allows a user to first select a player. A variety of jersey designs associated with the selected player are then displayed. The user may then select a first jersey portion comprising a first design and a second jersey portion comprising a second design. The first jersey portion and the second jersey portion can then be attached. Again, the first jersey portion and second jersey portion may be selected from a group of designs consisting of a professional team jersey, a college team jersey, and a high school team jersey. Also, a licensing fee may be calculated and added to the purchase price based on the designs selected. This would allow for automatic verification that the first jersey portion and the second jersey portion comply with a license agreement governing the designs.

In accordance with a third aspect of the present invention, a team player athletic jersey interface is provided. The team player athletic jersey interface may include a searchable database of athletes, a list of teams that each athlete has played for, and a database of images of each jersey associated with the list of teams. The team player athletic jersey interface also includes an option to select a first jersey portion comprising a first design and a second jersey portion comprising a second design selected from the database of images. The designs selected may be licensed designs, and the team player athletic jersey interface may provide real time licensing approval based on a license fee that is included in a purchase price.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications

BRIEF DESCRIPTION OF THE DRAWING(S)

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
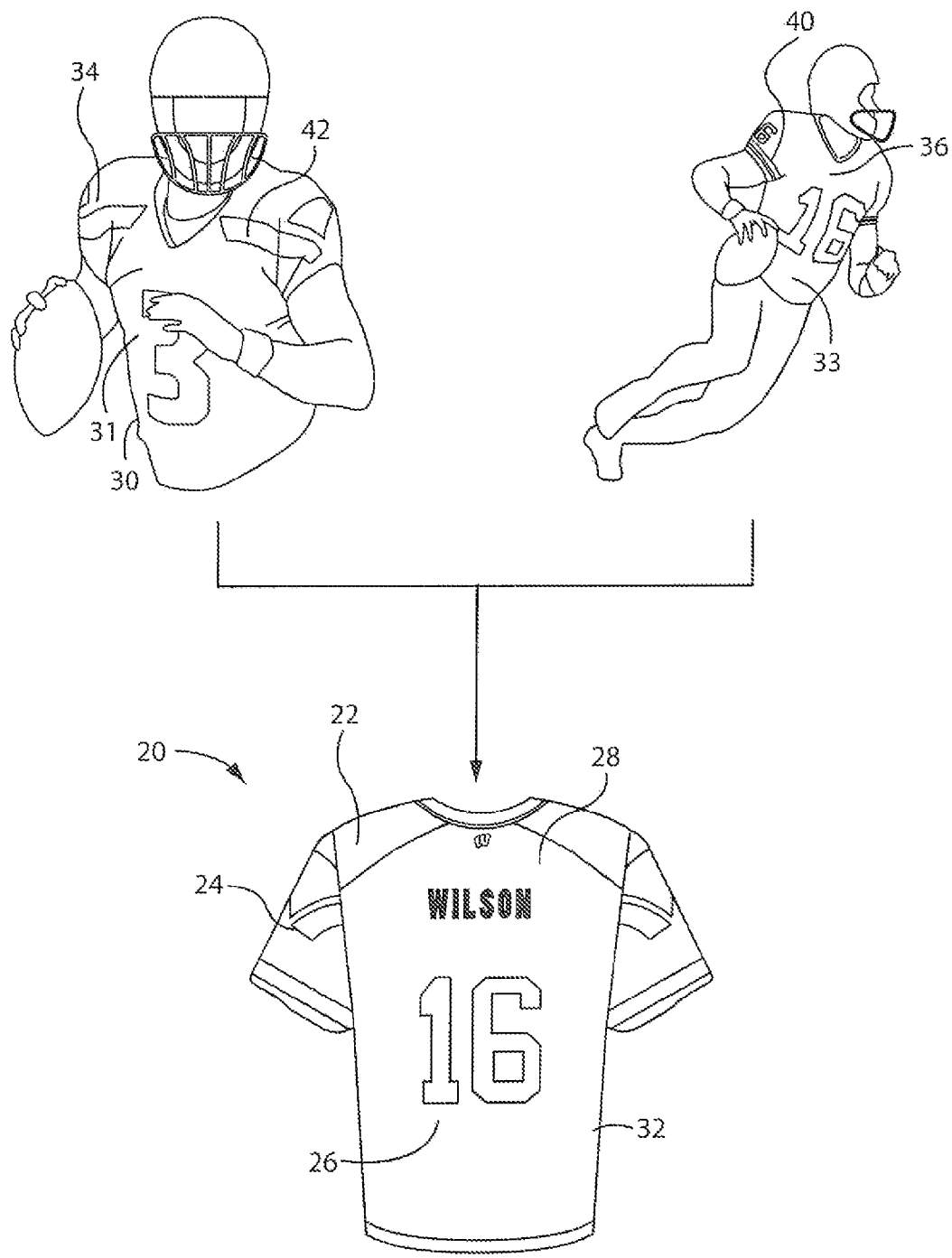
FIG. 1 illustrates a combination of a professional jersey design and a college jersey design resulting in a football team player athletic jersey.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The present invention and various features and advantageous details of the subject matter disclosed herein are explained more fully with reference to the non-limiting embodiments described in detail in the following description.

1. System Overview

Through this new ordering interface, the team player athletic jersey concept presents several new opportunities for fan and provider alike.

The Jersey Tells the Story the Customer Wants to Tell

Previously, a customer's only real choice for a replica jersey was home or away for a single team. Now, the customer selects home or away for each of two different jerseys: the current jersey and the legacy jersey. The differing colors and designs mean the customer has many more controls over the appearance of their jersey.

Even more important than appearance is the fan's ability to select which part of a player's history to honor with the legacy side of the jersey. Drew Brees plays professionally in New Orleans and played in college in West Lafayette, Ind., 900 miles north and a world away. In Louisiana's neighboring state, though, Brees was a high school legend, winning Texas High School 5A Most Valuable Offensive Player and leading Westlake High School to a state championship. Which combo would a southern fan prefer, Saints/Boilermakers or Saints/Westlake Chaparrals?

In addition, the Team Player jersey introduces a new market: the Westlake alum who buys the Drew Brees, Nick Foles, or Justin Tucker jersey solely because of their high school roots. With part of the Team Player jersey available to tip their hat to Westlake, fans may be interested in a Foles Team Player jersey when a Foles Eagles-only jersey wasn't a purchase they would consider.

When fans approach the team player athletic jersey interface, they are presented with an array of star players from the college and professional levels. The page for each player will tell their story; for example, a biography of Drew Brees with images from those pages of his history—Westlake, Purdue, New Orleans—and the tales of his accomplishments.

The specific point of ordering will provide multiple options for each side of the jersey and a rendering that dynamically updates to show the selected combination. The fan will be able to see his or her jersey before ordering it and making it their own.

Earn Amnesty at Away Games

Consider Russell Wilson's first visit to Lambeau Field. Packer fans, still hardened from 2012's "Immaculate Interception" incident, have reason to feel hostile towards the team that won that game and the man who threw the pass. However, once fans wearing the Wilson team player athletic jersey show a University of Wisconsin back to the Seattle Seahawks front, they acknowledge Wilson's Wisconsin roots. He played for you, and now he plays for us—wherever he plays, I'll be there.

A Whole New Product for a Small Amount of Inventory

One key advantage of the team player athletic jersey—the fan's ability to pick and choose their design combination at the point of online ordering—forces the supplier to find a smart fulfillment solution. One supplier simply cannot hold stock of each combination in inventory. However, rapid-response manufacturing is a real possibility for the Team Player jersey because most of these parts already exist. Drew Brees has been a perennial top-ten jersey seller among NFL athletes. The Saints fronts and backs already exist, and the process step of stitching them to another side already happens. All a trailblazing new apparel product like team player athletic jerseys needs is modest inventory of college and high school sides.

Team Player Jerseys are a Multi-Sport Platform

Team player athletic jerseys are obvious clear winners for NFL fans, but also work in other sports. NBA draft eligibility rules have changed a number of times in the past decade, and some current superstars were eligible right out of high school. Team Player jerseys are great opportunity for high schools to shine a light on their alums. Hockey is a similar ecosystem and offers the same opportunity.

In addition, the Team Player all-star line is ripe for development. The Kevin Durant jersey with the Thunder on front and his 2006 McDonald's All-American jersey on the back. Patrick Peterson with a Cardinals front and his 2008 U.S. Army All-American Bowl jersey on the back. Team player athletic jerseys can also go international: Sidney Crosby with the Pittsburgh Penguins on the front and any of his Canadian teams on the back: Astral Drive Junior High School, Shattuck-St. Mary's, Rimouski Oceanic, Truro Bearcats, or even the 2010 Team Canada Olympic jersey.

The Team Player jersey can also incorporate All-Star, Pro Bowl, and throwback jerseys, as well as past teams of current players (e.g. Brees and the Chargers). This translates to enormous levels of customizability for fans.

2. Detailed Description of Preferred Embodiments

Figure 2:
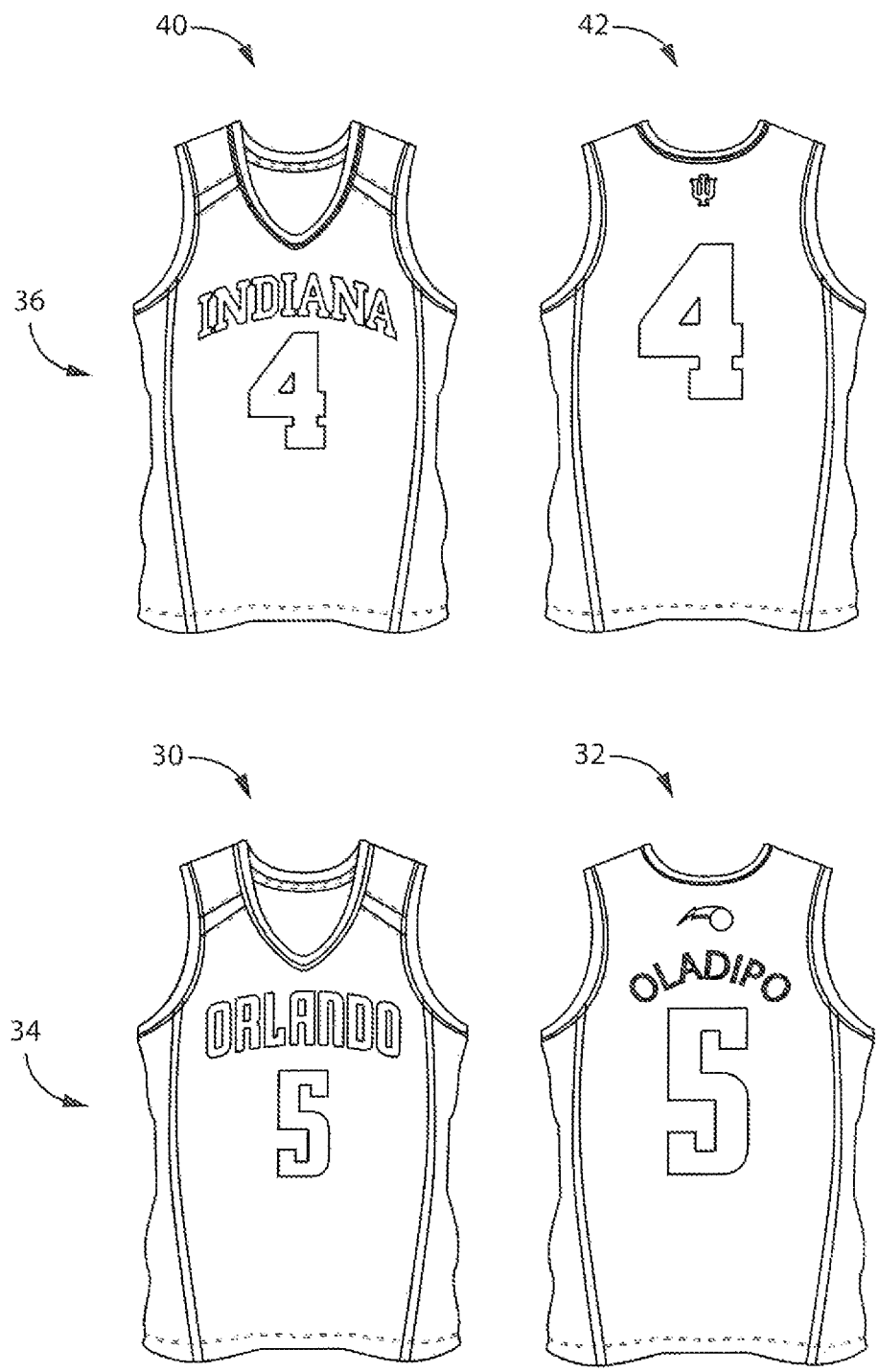
FIG. 2 illustrates a number of options available for a basketball team player athletic jersey.

The invention constructed in FIGS. 1 and 2 shows a team player athletic jersey 20 with a first jersey portion 22 and a second jersey portion 26. The first jersey portion 22 has a first design 24 and the second jersey portion 26 has a second design 28. The first design 24 and the second design 28 may be selected from a variety of different jersey design possibilities, for instance a professional team jersey 34, a college team jersey 36 and a high school team jersey 38. The team player athletic jersey 20 is custom made to order such that the user can personalize the jersey 20 as he or she sees fit. To allow for further customization, home jersey designs 40 and away jersey designs 42 could be used. These jersey designs may be selected based on the various teams that an athlete has played for over the years. This allows a purchaser to support a player over the course of his or her career as opposed to during a single point in time. This allows a fan to be a fan of the player, not necessarily the team.

By way of example, FIG. 1 shows one possible athletic sport jersey 20 option. Russell Wilson played football for the Wisconsin Badgers. In the top right corner of FIG. 1, Russell is shown in a home design 40 college team jersey 36. Upon graduation, Russell Wilson began playing football for the Seattle Seahawks. Looking to the upper left corner of FIG. 1, Russell is shown in an away design 42 professional team jersey 34. A user could then select a team player athletic jersey 20 that combines the front of the Seattle Seahawks jersey with the back of the Wisconsin Badgers jersey and shown in the bottom of FIG. 1. As Russell Wilson Seattle Seahawks jerseys are currently being manufactured, front half and back half jerseys for Seahawk home and away jersey are readily available. Russell Wilson Wisconsin Badgers jerseys could easily be produced and affixed to a Seattle Seahawks jersey in the event that a user desired such a jersey.

Another possible examiner is shown in FIG. 2, where a basketball team player athletic jersey 20 is shown. Victor Oladipo played basketball for the Indiana Hoosiers before being professional play for the Orlando Magic. FIG. 2 shows the front half 30 of a college team jersey 36 home design 40 and a back half 32 of a college team jersey 36 away design 42. Additionally, a front half 30 of a professional team jersey 34 home design 40 and a back half 32 of a professional team jersey 34 away design 42. A user could select a combination of these various designs, which could be attached to create an team player athletic jersey 20.

Additional jersey design options may be available, for instance, where teams have multiple jersey designs such as throw back or other special event jerseys. Furthermore, football players who play for multiple teams will have additional jersey design options. On a similar note, players may play for different leagues, for instance, international leagues or junior leagues, prior to reaching success on a professional level. Users can review the various professional, college, high school, and other league jersey designs and select any combination they wish. Although the illustrated embodiments show use of football jerseys, similar team player athletic jerseys 20 could be created for other sports, for instance, basketball, soccer, baseball, rugby, hockey or other sports.

In the illustrated embodiment, the first jersey portion 22 will be a front half 30 of a first jersey 31. The second jersey portion 26 will be a back half 32 of a second jersey 33. Traditional sports jerseys are usually manufactured first by creating a front half, then a back half, and finally attaching the two usually by stitching along a seam. By combining a front half and a back half, the two jersey designs do not need to be specially made. Rather, the customization can be achieved by simply attaching two pre-made jersey halves. Another resulting benefit is cost savings that are incurred as a user can purchase a single jersey that represents multiple jerseys that span the career of a given player. This means that two jerseys can be represented for the cost of one.

Additionally, it should be noted that all professional and collegiate jersey designs are licensed designs. This can also be true for larger high school programs. As a result, it can be difficult and costly to achieve the required license clearance. Different jersey producers retain license rights to produce athletic apparel for certain teams. As a result, to achieve the same result as the proposed inventive team player athletic jersey 20 in the past, a user would have to custom make their own jersey by purchasing two jerseys and manually detaching the jerseys and reassemble the two halves. This would require a user to find another individual who wanted an opposite jersey combination in the same size or paying the expense of two jerseys. Here, however, the license fee can be incorporated into the purchase price of the team player athletic jersey 20. The license can be automatically verified when the team player athletic jersey 20 is purchased. Not only is this convenient, but it also gives the purchaser peace of mind that the purchased team player athletic jersey 20 is a legal garment.

Figure 3:
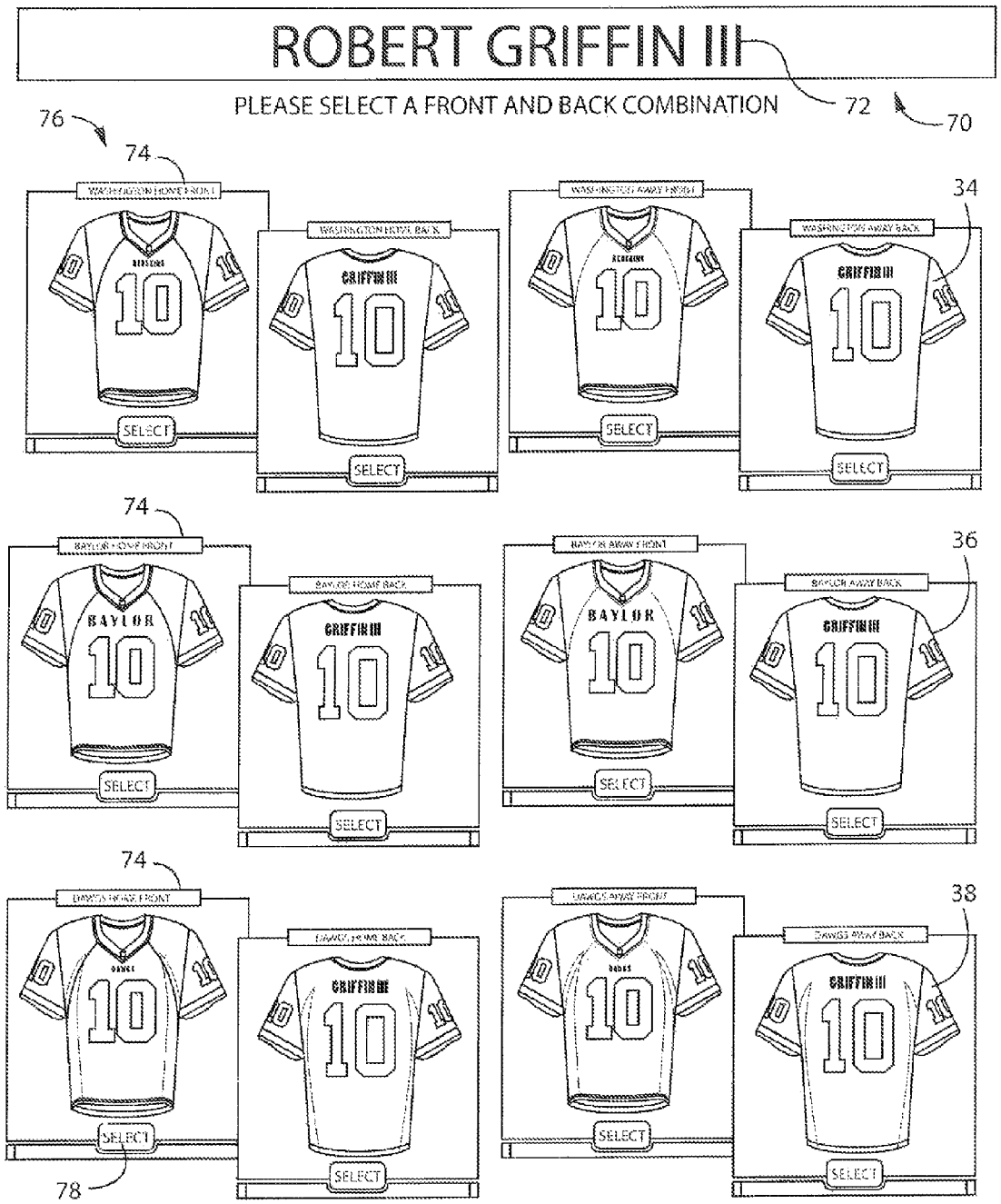
FIG. 3 illustrates a team player athletic jersey ordering interface.

Additionally, looking to FIG. 3 a team player athletic jersey interface 70 may be provided that facilitates ordering of the team player athletic jersey 20. The interface includes a searchable database of athletes 72. Once an athlete is selected, Robert Griffin III in the illustrated embodiment, the various teams 74 are displayed. Additionally, a database of sample images 76 of each jersey are provided that are associated with each team. The user then has an option 78 to select a first jersey portion 22 and a second jersey portion 26 from the database of images. Again, in the illustrated embodiment, the first jersey portion 22 is a front half 30 of a first jersey 31 and the second jersey portion 26 is a back half 32 of a second jersey 33. In one embodiment, one of the front half 30 and the back half 32 is a home design 40 and one of the front half 30 and the back half 32 is an away design 42. Where the jersey designs are licensed, a license fee may be included in the purchase price. This would allow for real time licensing approval.

Still looking to FIG. 3, the various team player athletic jersey 20 options for Robert Griffin III are illustrated. Robert Griffin III currently plays for the Washington Redskins. The Redskins have professional team jerseys 34 including a home design 40 and an away design 42. Prior to becoming a professional athlete, Robert Griffin III played for the Baylor Bears. Both home design 40 and away design 42 college team jerseys 36 for the Bears are shown. Additionally, in high school Robert Griffin III played for the Copperas Cove High School Bulldawgs. His high school jerseys 38 include a home design 40 and an away design 42. Using the team player athletic jersey interface 70, any combination of the below listed jerseys could be selected.

| CHOOSE FRONT | CHOOSE BACK |
| --- | --- |
| Dawgs Home | Dawgs Home |
| Dawgs Away | Dawgs Away |
| Baylor Home | Baylor Home |
| Baylor Away | Baylor Away |
| Redskins Home | Redskins Home |
| Redskins Away | Redskins Away |

Figure 4:
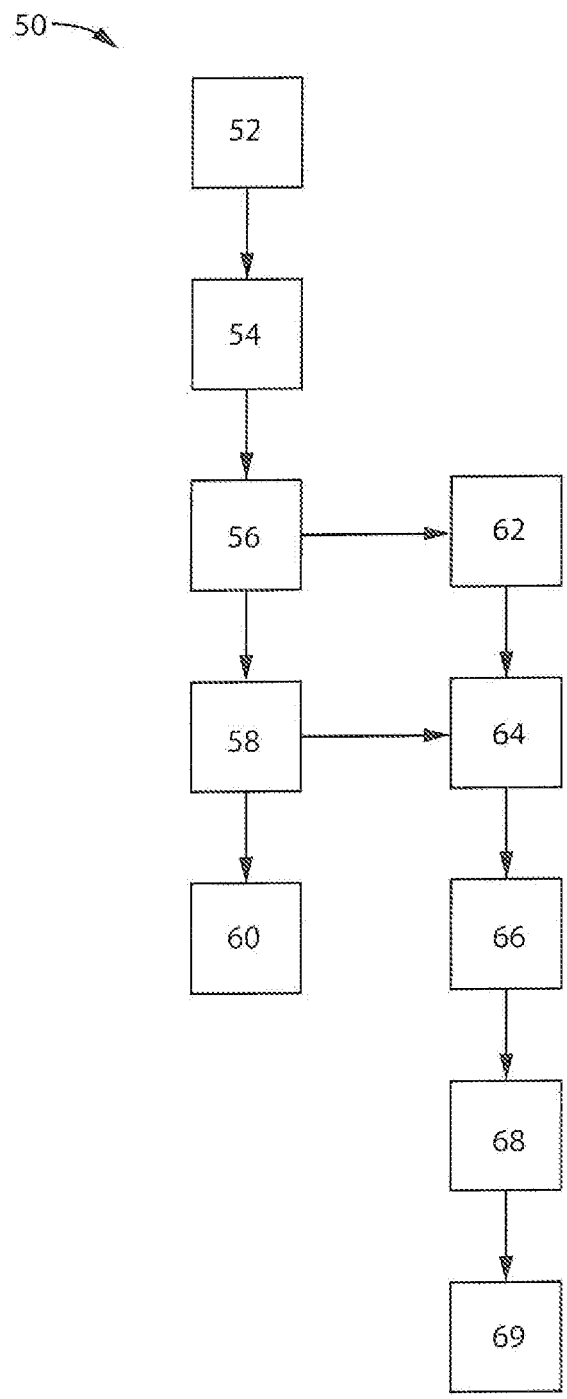
FIG. 4 illustrates a method of ordering a team player athletic jersey.

Moving now to FIG. 4, a method of ordering a team player athletic jersey 50 is shown. First a player is selected 52. A variety of jersey designs are displayed that are associated with the selected player 54. The user can then select a first jersey portion that includes a first design associated with the player 56. The first jersey portion is selected from a group of designs including a professional team jersey, a college team jersey, and a high school team jersey 62. Next, the user can select a second jersey portion that includes a second design associated with the player 58. The second jersey portion is also selected from a group of designs including a professional team jersey, a college team jersey, and a high school team jersey 64. The first jersey portion and the second jersey portion can then be attached 60. For instance, the first jersey portion can be attached to a second jersey portion by stitching 69. Additionally, a purchase price may be calculated that includes a licensing fee 66. Furthermore, the license agreement can be automatically verified at the time of purchase to ensure the appropriate fees have been paid 68.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

For example, the steps shown in FIG. 4 need not occur in the order in which they are listed. Furthermore, some, but not all of the steps may be performed. Further still, additional steps may be performed that have not be explicitly listed above. Additionally, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A method of ordering a team player athletic jersey comprising the steps of:
   selecting a player from a searchable database of athletes,
   displaying images of a variety of jersey designs associated with the player,
   selecting a first jersey portion comprising a first design associated with the player,
   selecting a second jersey portion comprising a second design associated with the player,
   automatically verifying that the first jersey portion and the second jersey portion comply with a license agreement governing the group of designs, and
   customizing a physical jersey by attaching the first jersey portion to the second jersey portion.

2. The method of claim 1 further comprising the steps of
   selecting the first jersey portion from a group of designs consisting of a professional team jersey, a college team jersey, and a high school team jersey; and
   selecting the second jersey portion from a group of designs consisting of a professional team jersey, a college team jersey, and a high school team jersey.

3. The method of claim 2 further comprising the step of calculating a purchase price that includes a licensing fee.

4. The method of claim 1 wherein attaching the first jersey portion to the second jersey portion is performed by stitching.

* * * * *